United States Patent [19]

Nellen et al.

[11] 4,121,723
[45] Oct. 24, 1978

[54] INSTALLATION FOR STACKING SHEET METAL PLATES INTO PACKETS AND FOR SUPPLYING THE PACKETS TO A BINDING STATION

[75] Inventors: Wilhelm Nellen; Theodor Sevenich, both of Dortmund; Konrad Klein, Dortmund-Wambel; Ladislav Gregorec, Dortmund, all of Fed. Rep. of Germany

[73] Assignee: Hoesch Werke Aktiengesellschaft, Dortmund, Fed. Rep. of Germany

[21] Appl. No.: 745,125

[22] Filed: Nov. 26, 1976

[30] Foreign Application Priority Data

Nov. 26, 1975 [DE] Fed. Rep. of Germany ....... 2552995

[51] Int. Cl.² ............................................ B65G 57/00
[52] U.S. Cl. .................................. 214/6 D; 198/592; 271/273
[58] Field of Search ................... 214/6 D, 6 DS, 6 H, 214/1 S; 271/273; 198/592, 690

[56] References Cited

U.S. PATENT DOCUMENTS

| 2,980,265 | 4/1961 | Johnson et al. | 214/6 H |
| 3,053,025 | 9/1962 | Nigrelli et al. | 198/690 |
| 3,369,675 | 2/1968 | Buccione | 214/6 DS |
| 3,374,902 | 3/1968 | Mills | 214/6 H |
| 3,430,784 | 3/1969 | Hall | 214/6 H |
| 3,977,537 | 8/1976 | Buccione | 214/6 DS |

FOREIGN PATENT DOCUMENTS 1,008,247  10/1965  United Kingdom ................ 214/6 H Primary Examiner—Albert J. Makay
Assistant Examiner—Ross Weaver
Attorney, Agent, or Firm—Walter Becker

[57] ABSTRACT

A device for preparing metal sheets for transport wherein the sheets are delivered on a conveyor belt from a shearing region to a stacking region in which the sheets are engaged from above at the discharge end of the conveyor belt and transported longitudinally and deposited on selected ones of tables to build up stacks of sheets. The stacks of sheets are moved laterally by lateral movement of the tables or by laterally extending chains to a lifting station wherein the stacks of sheets are engaged from above by cranes and conveyed thereby to a binding station for binding of the stacks of sheets.

9 Claims, 3 Drawing Figures

INSTALLATION FOR STACKING SHEET METAL PLATES INTO PACKETS AND FOR SUPPLYING THE PACKETS TO A BINDING STATION

The present invention relates to an installation for stacking sheet metal plates into packets past a line of shears and a transverse guiding installation for transferring the sheet metal packets to a following processing unit, in particular sheet metal packet binding installation.

Stacking devices of the above mentioned general type have become known which comprise a driving device, lateral guiding means arranged behind said driving device and an abutment. The driving device pushes the individual metal sheets between said lateral guiding means toward an abutment, and a sheet metal packet is formed on a palette placed between said lateral guiding means. After the stacking process has been completed, the palette with the sheet metal packet is moved longitudinally or laterally out of the stacking device and outside the stacking device is lifted off by a crane which moves the palette with the sheet metal packet to the binding station. During the outward movement of the palette with the sheet metal packet and during the insertion of the new palette, the line of shears has to be at a standstill which results in a considerable production loss. Furthermore, stacking devices have become known according to which by means of magnetic rolls, electric magnets supported on transporting chains, or air operable suction devices suspended on transporting belts, the metal sheets are from below a stacking bridge transported to stacking places. Here the stacks of sheet metal plates are formed between abutments and lateral guiding means on lifting tables and the lifting tables deposit the sheet metal packets on lifting beam conveyors for a lateral further transport. With this arrangement, however, on one hand gaps are formed on the lifting beam conveyor, when the latter is intended to establish connection between a line of shears and a binding line. More specifically, these gaps appear when disorders occur within the region of the line of shears. On the other hand, the line of shears has to be stopped when a disorder occurs within the region of the binding line.

It is, therefore, an object of the present invention to provide an installation which will overcome the above outlined defects of heretofore known devices of the type involved and which will compensate for and will during the stacking of metal sheets into sheet metal packets avoid all disorder periods which may occur by smaller mechanical or electrical damages in the preceding line of shears or in the following line of binding means in view of the insertion of new bundles into the de-rolling machine of the line of shears and/or by the outward movement of the sheet metal packets.

It is a further object of the invention to provide an installation as set forth in the preceding paragraph which will assure a low noise level of the operation and also will save labor forces.

These objects and other objects and advantages of the invention will appear more clearly from the following specification in connection with the accompanying drawings, in which.

The above outlined objects underlying the present invention have been solved according to the invention by a feeding transporting belt, a stacking bridge arranged behind the feeding transport belt and working in longitudinal direction, one or more lifting tables arranged below the stacking bridge and movable transverse to the latter, and a transporting device operating transverse and below the stacking bridge. The transporting device engages recesses extending in the driving direction and provided in the lifting tables. There is furthermore provided an overhead trolley or conveyor with movable sheet metal packet pliers. This trolley or conveyor works on the other transverse side of the transporting device working transverse to the stacking bridge, said trolley or conveyor operating in transverse direction to said last mentioned transporting device and above the same.

In an expedient manner the stacking bridge comprises a bridge construction, a plurality of transporting chains arranged parallel to each other and located on said bridge construction, and furthermore comprises lateral guiding means operating perpendicularly with regard to the transporting chains. Between the transporting chains there are in a distributed manner arranged magnets, a stationary abutment at the end of the stacking bridge, and liftable and lowerable abutments for the front sheet metal edges, and abutments for the rear sheet metal edges which are adjustable in the longitudinal direction of the transporting chains. These abutments are distributed in conformity with the movement of the lifting tables over the length of the stacking bridge. The transporting device which operates transverse to the stacking bridge comprises a plurality of transporting chains arranged parallel adjacent to each other, said transporting chains covering the entire width of at least one of the lifting tables. Furthermore, it is expedient that the end of the feeding conveyor belt is overlapped by the transporting chains of the stacking bridge and/by the magnets arranged between the transporting chains. The end of the feeding conveying belt is by means of a hoisting device adapted to be lifted and lowered.

Finally, it is advantageous to adapt the overall length of the sheet metal packet pliers to the width of the transporting device with the transporting chains.

Figure 1:
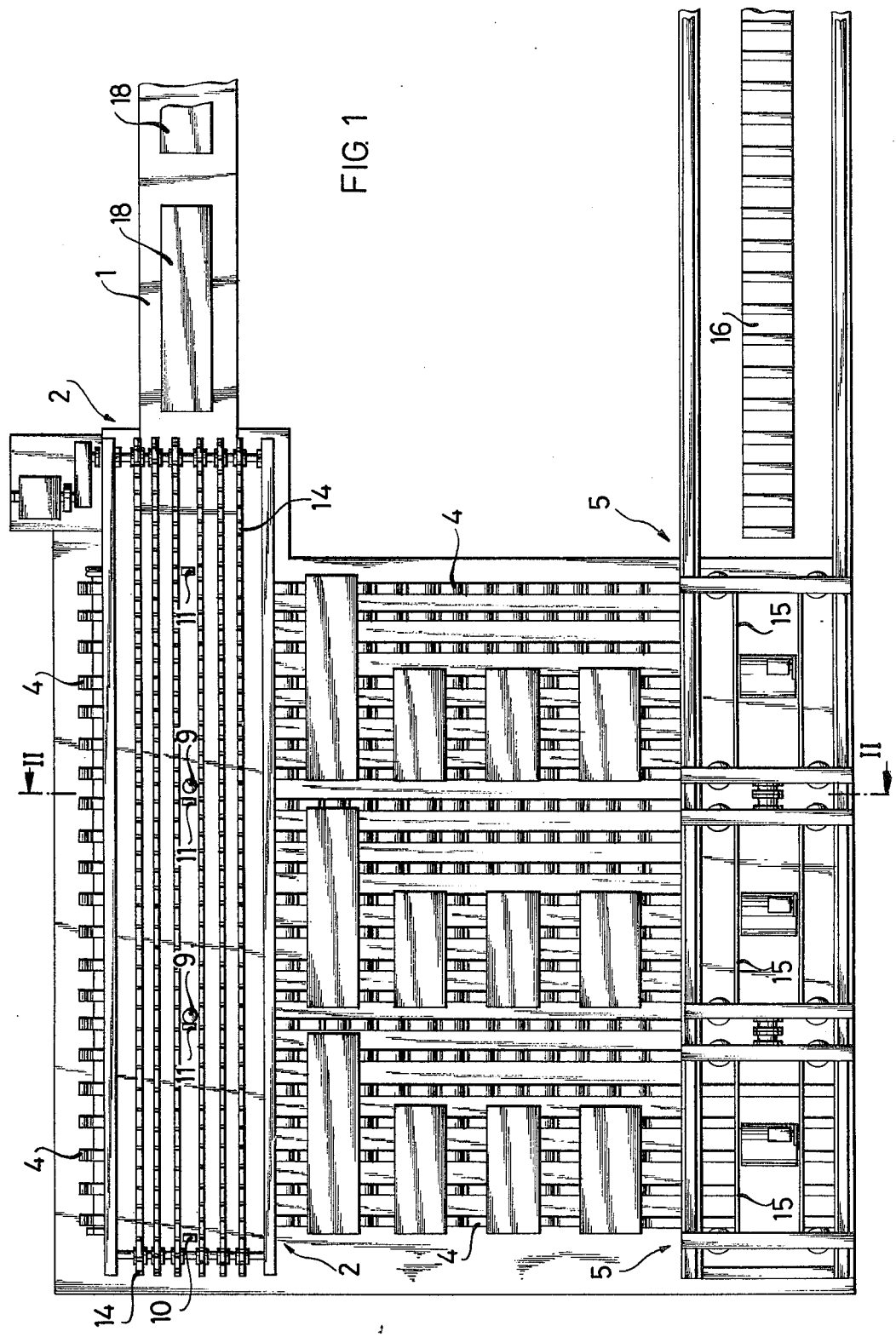
FIG. 1 shows a top view of an installation according to the invention.
Figure 2:
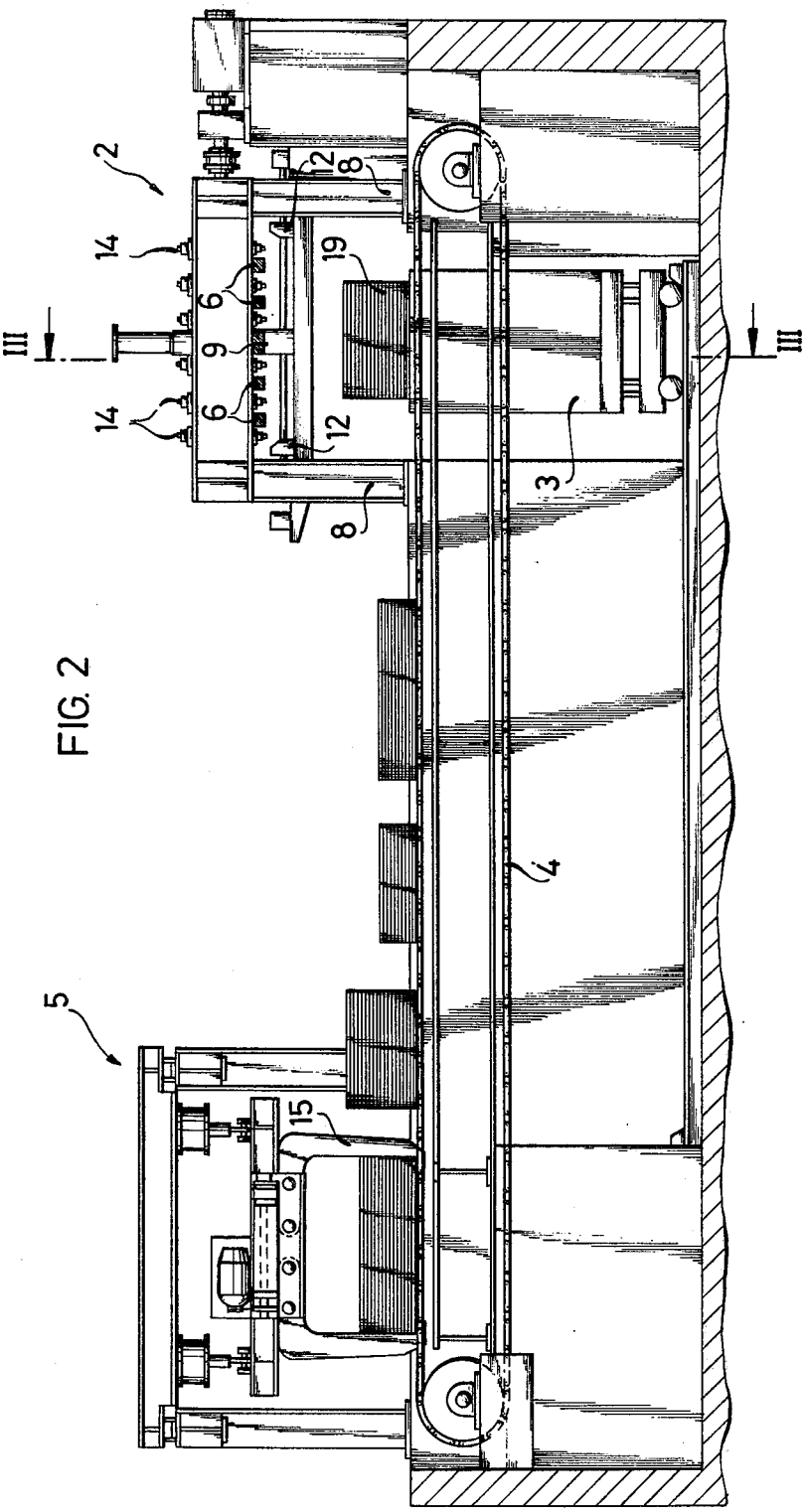
FIG. 2 is a view partially in section taken along the line II—II of FIG. 1.
Figure 3:
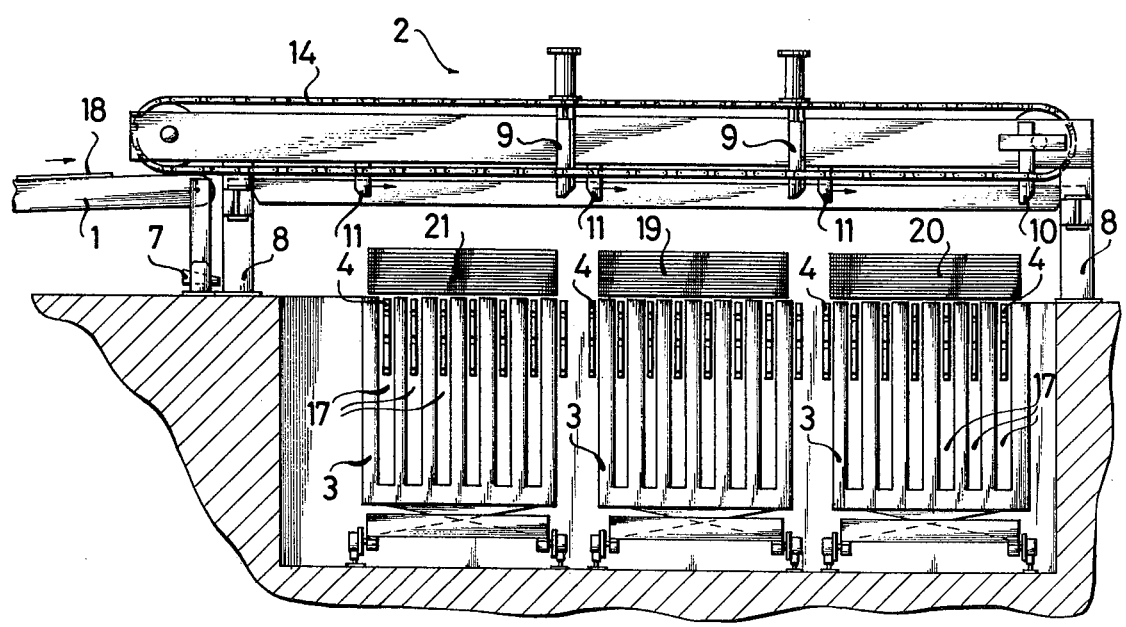
FIG. 3 is a view partially in section taken along the line III—III of FIG. 2.

Referring now to the drawings in detail, as will be seen from FIGS. 1–3, the installation according to the invention comprises a feeding conveying belt 1, a stacking bridge 2 arranged in the longitudinal direction behind said belt 1. The installation furthermore comprises lifting tables 3 which are adapted below the stacking bridge 2 to be displaced transverse to the latter. The installation according to the invention also includes a plurality of transporting chains 4 which are arranged parallel adjacent to each other while extending transverse to the stacking bridge 2 and working therebelow. The transporting chains 4 cover the entire width of the lifting tables 3 and engage recesses 17 which are arranged in the lifting tables 3 and extend in the driving direction. There is furthermore provided an overhead trolley or conveyor 5 which operates on the other transverse side of the transporting chains 4 working transverse to the stacking bridge 2, said overhead trolley or conveyor operating transversely to said transporting chains 4 and above the same. The trolley or conveyor 5 is equipped with movable sheet metal packet pliers 15 which have an overall length corresponding to the overall width of the transporting chains 4. The stacking bridge 2 comprises a bridge construction 8, a plurality of transporting chains 14 working parallel adjacent to each other and in the longitudinal direction of said chains 14. The bridge 2 furthermore comprises lateral guiding means 12 which operate perpendicularly to said transporting chains 14. Between the transporting chains 14 there are provided magnets 6, a stationary abutment 10 at the end of the stacking bridge 2, and liftable and lowerable abutments 9 for the front metal sheet edges, and abutments 11 which are adjustable in the longitudinal direction of the transporting chains 14. The abutments are provided for the rear metal sheet edges in conformity with the number of the lifting tables 3 and are distributed over the length of the stacking bridge 2. The end of the feeding conveyor belt 1 is overlapped by the transporting chains 14 of the stacking bridge 2 and by the magnets 6 arranged between the transporting chains 14. The end of the feeding conveyor belt 1 is adapted by means of a hoisting device 7 to be lifted and lowered so that the spacing between the lower edge of the transporting chains 14 and the upper edge of the feeding conveying belt 1 can be adapted to the thickness of the metal sheets 18 to be stacked.

The metal sheets 18 which may for instance come from a non-illustrated line of shears and on the feeding conveyor belt 1 move into the stacking bridge 2 will by means of the magnets 6 be pulled below the transporting chains 14. Depending on the metal sheet length, the sheets 18 move up to one of the liftable and lowerable abutments 9 or the stationary abutment 10. Shortly prior to reaching one of the abutments 9 adapted to be lifted or lowered or the stationary abutment 10, the magnets 6 are turned off, and the metal sheets 18 drop onto the stacking station which is formed by one of the abutments 9 and 10 and one of the abutments 11 displaceable in longitudinal direction, and by the lateral guiding means 12 on one or more of the lifting tables 3. During the stacking operation, the lifting table 3 located below the stacking station is slightly lowered in conformity with the increase for instance of the sheet metal packet 19. After the sheet metal packet 19 has been completed, the abutment 9 is without stopping of the non-illustrated line fo shears moved upwardly, and the metal sheets 18 move to the next abutment 9 or to the stationary abutment 10. When in front of the stationary abutment 10 a sheet metal packet 20 is formed, it will be appreciated that after completion of the sheet metal packet 20, the first abutment 9 is moved downwardly, and the new sheet metal packet 21 is formed in front of this abutment 9.

After one of the sheet metal packets 19, 20, 21 has been completed, the corresponding lifting table 3 is lowered to such an extent that the upper edge of the sheet metal packet 19, 20 or 21 which is formed on said table 3 will be located below the lower edge of the lateral guiding means 12. Thereupon, the lifting table 3 is laterally displaced, and the metal sheet packet 19, 20 or 21 is lowered and deposited onto the transporting chains 4. Subsequently, the lifting table 3 moves back below the stacking bridge 2 and there is again lifted into its receiving position. When the metal sheet packets are formed faster than they can be bound, which may occur with smaller metal sheet packets, the lifting carriages or tables 3 form an intermediate storage pile on said transporting chains 4. If subsequently large metal sheet packets are formed, the metal sheet packet binding station 16 which follows the overhead trolley or conveyor will work faster than the metal sheet packets are formed whereby the intermediate storage pile is being used up. The intermediate storage pile moves slowly on with the transporting chains 4. At the end of the transporting chains 4, the metal sheet packets are by means of metal sheet packet pliers 15 movably suspended on the overhead trolley 5 lifted off the chains and conveyed to the packet binding station 16 for further processing.

As will be evident from the above, the advantages of the installation according to the invention are seen primarily in that all disorder times occur for instance by damage in preceding lines of shears or in following packet binding stations and/or by the insertion of new bundles into the de-rolling machine of the line of shears or by the withdrawal of metal sheet packets from the stacking device, are compensated for or avoided. Thus, an operation which operates with a minimum of noise is assured while considerable labor and crane operating work will be saved.

It is, of course, to be understood that the present invention is, by no means, limited to the specific showing in the drawings, but also comprises any modifications within the scope of the appended claims.

What is claimed is:

1. A device for preparing metal sheets for transport wherein the sheets are delivered individually from a shearing region to a stacking region on sheet transporting means which comprises in combination: a stacking station comprising a stacking bridge having a first conveyor therein at the discharge end of the sheet transporting means adapted supportingly to engage the sheets from above and to convey the sheets longitudinally in the bridge, receiving table means beneath said first conveyor, means for releasing sheets from said first conveyor to said table means to build a stack of sheets thereon, means for moving the stack of sheets built up on said table means in the lateral direction from beneath said first conveyor, a lift station spaced laterally from said bridge for receiving said stack of sheets for intermediate storage and comprising crane means for engaging said stack of sheets from above and lifting said stack of sheets, and means for moving said crane means out of said lift station and into a binding station for binding of the stack of sheets, said table means comprising a plurality of tables in end to end complementary relation and said means for releasing sheets from said first conveyor comprises means to quietly release sheets independently to respective ones of said tables, the space between said stacking station and said lift station being sufficiently long to receive a plurality of stacks of sheets, and transversely extending means extending transversely from said stacking station to said lift station for each table to support stacks of sheets formed on the respective table and moved out of said stacking station but not supplied to said lift station.

2. A device for preparing metal sheets for transport wherein the sheets are delivered individually from a shearing region to a stacking region on sheet transporting means which comprises: a stacking station comprising a stacking bridge having a first conveyor therein at the discharge end of the sheet transporting means adapted supportingly to engage the sheets from above and to convey the sheets longitudinally in the bridge, receiving table means beneath said first conveyor, means for releasing sheets from said first conveyor to said table means to build a stack of sheets thereon, means for moving the stack of sheets built up on said table means in the lateral direction from beneath said first conveyor, a lift station spaced laterally from said bridge for receiving said stack of sheets and comprising crane means for engaging said stack of sheets from above and lifting said stack of sheets, and means for moving said crane means out of said lift station and into a binding station for binding of the stack of sheets, said table means comprising a plurality of tables in end to end relation and said means for releasing sheets from said first conveyor comprises means to release sheets to respective ones of said tables, the space between said stacking station and said lift station being sufficiently long to receive a plurality of stacks of sheets, and transversely extending means extending transversely from said stacking station to said lift station for each table to support stacks of sheets formed on the respective table and moved out of said stacking station but not supplied to said lift station, said transversely extending means including second conveyor means adapted to engage stacks of sheets to move the stacks laterally into said lift station, said tables being slotted to receive the respective second conveyor means and being vertically movable to dispose the table upper surface above or below the respective second conveyor means, said tables being movable laterally from the stacking station toward and away from said lift station.

3. A device according to claim 2 which includes a second conveyor for each table extending laterally from said stacking station to said lift station, each table having slot means in which the respective second conveyor is movable, each table being vertically movable to dispose the upper sheet receiving surface in either of a first position above and a second position below the respective second conveyor.

4. A device according to claim 2 which includes electromagnets in said bridge energizable for transferring sheets to and for holding the sheets on said second conveyor, said means for releasing sheets to said tables comprising a sheet abutment means in said bridge for abutting the leading edges of the sheets to be supplied to each table and means for controlling the energization of said electromagnets.

5. A device according to claim 4 which also includes further abutment means in said bridge for abutment with the rear edges of sheets supplied to said tables.

6. A device according to claim 2 in which said first conveyor means comprises chain means.

7. A device according to claim 3 in which said second conveyor means comprises chain means.

8. A device according to claim 2 in which said sheet transporting means comprises a belt which at the discharge end extends underneath and overlaps said first conveyor means, and means for adjusting the discharge end of said belt in the vertical direction.

9. A device according to claim 2 in which said crane means comprises a crane for each table.

* * * * *